3,406,134
MOISTURE-CURABLE URETHANE COATINGS
Joseph J. Seiwert, Groesbeck, and Jack B. Boylan, Springdale, Ohio, assignors to Emery Industries, Inc., Cincinnati, Ohio, a corporation of Ohio
No Drawing. Filed Nov. 2, 1964, Ser. No. 408,414
16 Claims. (Cl. 260—22)

ABSTRACT OF THE DISCLOSURE

A urethane prepolymer coating composition prepared from (1) a polyester formed from a mixture of dimer acid and an acid selected from the group consisting of phthalic acid, maleic acid, isophthalic acid, fumaric acid, phthalic anhydride, maleic anhydride, and mixtures thereof, and an aliphatic diol, (2) a polyol, and (3) a polyisocyanate. The prepolymer is converted into a cured coating by exposure to moisture.

---

This invention relates to improved moisture-curable urethane coating compositions in which the film forming ingredient is an isocyanate-terminated prepolymer of the polyester type. Such compositions are generally known in the art as one-component coatings because they are curable by atmospheric moisture and do not require the addition of a catalyst or a curing agent as a second component to be mixed at the time of use with the prepolymer.

More particularly, the invention provides improved properties in the cured film, particularly a unique combination of abrasion and chemical resistance obtained by the use of intermediate hydroxy-terminated polyesters containing a novel combination of dimerized ($C_{36}$) fatty acids and lower molecular weight dicarboxylic acids.

One-component moisture-cured urethane coatings are finding acceptance for marine and other exterior finishes, as well as floor or furniture finishes, because they are generally characterized by toughness, hardness, impact resistance, and good abrasion, chemical and water resistance. In addition, urethane coatings are utilized as prime and top coatings on leather, rubber, concrete and pre-finished building materials and other substrates where durable maintenance finishes are required.

To the extent the utility of these one-component moisture-cured coatings overlaps with two-component urethane coatings which require a catalyst or polyol curing agent, the one-component type is preferred for ease and convenience in use. Another limitation of two-component coatings is the short pot life after mixing. On the other hand, the one-component finishes cannot be pigmented without resort to special techniques due to reactivity of the isocyanate groups with any active hydrogen-containing substance in the pigment.

It has been known for some time that with the proper isocyanate content and triol to diol ratios, moisture-curable urethane coatings of the rapid drying, high performance type are obtainable from polyether-based prepolymers.

More recently, improved moisture-cured polyester-based urethane coatings were developed by forming an intermediate hydroxy-terminated polyester by reaction of alkylene or polyalkylene glycols with dimerized ($C_{36}$) fatty acids, instead of the conventional adipic acid or other short chain aliphatic dibasic acids, such as azelaic and sebacic. The moisture-curable isocyanate-terminated prepolymer is obtained by reacting the hydroxy-terminated polyester with a diisocyanate and a triol, or the reaction product of a diisocyanate and a triol. It has been demonstrated that dimerized fatty acid polyester-based urethane coatings at equivalent functionalities, molecular weight, and cross-link densities possess advantages over polyether-based urethane coatings which latter are standard in the trade for one-component moisture-cured coatings. They exhibit superior chemical and water resistance and weathering qualities, and comparable or better hardness flexibility, and impact resistance. While these dimerate polyester-based urethane coatings possess the foregoing advantages, they are lacking in abrasion resistance as evidenced by relatively high Taber abrasion values.

It is a primary object of the present invention to provide one-component moisture-cured urethane coatings which possess all of the advantages of the dimer acid polyester-based urethane coatings over polyether-based coatings, and which also exhibit greatly improved abrasion resistance.

It is a further object of the invention to provide urethane coatings of the one-component moisture-cured type which are particularly suitable as heavy duty finishes for floors and other surfaces because of the unique combination of high abrasion resistance and outstanding chemical resistance, including exceptional resistance to acid and textile chemicals, while retaining the exterior durability characteristic of the urethane coatings based on dimerate polyesters.

It was found that these objects and other advantages are obtainable by using an intermediate polyester prepared from a combination of dimerized fatty acids and one or more lower molecular weight dibasic acids such as phthalic, maleic, isophthalic and fumaric acid, phthalic anhydride, maleic anhydride, or mixtures thereof reacted with simple glycols. The result of improved abrasion resistance may be characterized as unexpected. The hardness and solvent resistance of urethane polymer films generally follow each other while abrasion resistance usually decreases with increase in the hardness and solvent resistance. However, in the present invention the modification of the dimer acid-based polyester leads to retention of comparable hardness and chemical resistance but with a large increase in abrasion resistance. This is the unexpected and unique combination of film properties provided by the present invention.

The intermediate polyesters of the invention are prepared by reacting alkylene or polyoxyalkylene glycols, for example, ethylene glycol, diethylene glycol, propylene glycol, dipropylene glycol, butylene glycol, etc., with an acid mixture of from 20 to 80 mol percent of a long chain dicarboxylic dimerized acid, and conversely about 80 to 20 mol percent of at least one relatively low molecular weight dibasic acid, such as phthalic, maleic, isophthalic, fumaric acids, phthalic anhydride, maleic anhydride, or mixtures thereof. The long chain dicarboxylic dimer acids are prepared by polymerization of unsaturated fatty acids, such as oleic, linoleic, linolenic, and other mono and polyunsaturated acids, usually derived from various vegetable oils and from tall oil.

The proportions of the respective glycol and the acid reactants are such that the resulting linear polyester has a hydroxyl functionality of about 2, that is, the polyester has a free hydroxyl group at each end of the molecule. The reaction of the glycol and the acids is conducted for a time such that the resulting polyester has a relatively low acid value, preferably less than 5, and a hydroxyl number of from about 50 to about 150 or even as high as 200. The molecular weight of the intermediate polyester may range from about 500 to 3000, preferably 1000 to 2500.

The moisture-curable isocyanate-terminated polyster prepolymer commonly referred to as a urethane varnish is formed by reacting the intermediate polyester with a polyfunctional isocyanate, such as toluene diisocyanate, hexamethylene diisocyanate, p,p'-diphenylmethane diisocyanate, or other suitable diisocyanates known in the art, and an aliphatic polyol such as glycerine, trimethylolpropane, trimethylolethane, 1,2,6-hexanetriol and other suitable triols and higher polyols of from 3 to 6 carbon atoms, such as pentaerythritol. The diisocyanate and the polyol may be reacted simultaneously with the polyester or sequentially, that is, the polyol and isocyanate may be reacted first and then the polyester added to the reaction mixture. The quantity of diisocyanate is proportioned to the polyol and the intermediate polyester to provide an excess of isocyanate over hydroxy such that there are no free hydroxyl groups, but with a minimum of unreacted diisocyanate to avoid the toxicity of this monomer. Where the polyol and diisocyanate are pre-reacted, the quantity of the resulting polyisocyanate is proportioned to the polyester to give a similar excess of isocyanate and NCO content to the urethane varnish. The resulting chain-extended intermediate polyester is a branched structure having isocyanate groups at all terminals, and with a NCO content (e.g. 5–10%) sufficient to cure suitably by reaction with atmospheric moisture.

It is common practice and generally preferable to react the dibasic acids and glycol to form the intermediate polyester under convention esterification conditions in which no solvent is employed. p-Toluene sulfonic acid, phosphoric acid, or other suitable esterification catalyst may be employed. In forming the isocyanate-terminated prepolymer, the reaction of the polyester with the diisocyanate and polyol or their reaction product is conducted in solution using a suitable organic solvent such as xylene, toluene, Cellosolve acetate, or 2-ethoxyethyl acetate and other known urethane solvents. The isocyanate reacts with the hydroxyl groups of the polyol and the intermediate polyester with the formation of urethane groups to provide a chain-extended and branched isocyanate-terminated prepolymer which is curable by reaction with atmospheric moisture. As is practiced in the art, the ratio of urethane groups to ester groups in the prepolymer may be increased and the viscosity of the prepolymer further controlled by utilizing minor amounts, e.g. up to 5% by weight of a monomeric diol in forming the prepolymer. The diol may conveniently be ethylene or diethylene glycol, propylene glycol, 1,2-propanediol, 1,3-butanediol and other suitable low molecular weight diols which act to extend the polyester chain through formation of urethane groups. Again, sufficient excess of polyisocyanate is used to assure the prepolymer is isocyanate-terminated.

The dimer acid employed in forming the intermediate polyester according to the invention may be prepared by polymerization of selected fatty acids of both mono and polyunsaturated types in accordance with processes disclosed in U.S. Patents 2,482,761, 2,793,219, 2,793,220 and 2,955,121. The polymeric fatty acids which result from the polymerization are predominantly dimers of the unsaturated fatty acids in the feed stock with minor quantities of trimer (tribasic) polymeric acids and small quantities of monobasic acids, primarily $C_{18}$ monocarboxylic acids. These monobasic acids need not be removed from the commercial product. In fact, for formation of the desired polyester, it is preferable to retain the small monobasic acid content in the dimer acid to compensate for the trimer (tribasic) acid which is not removed. In this way the hydroxyl functionality of the essentially linear polyester may be maintained at the desired level of 2, or slightly higher. If desired, extraneous monobasic acids may be added to the total acid feed used in preparing the intermediate polyester to further compensate for the tribasic acid content in the dimer. Such acids may be aliphatic monobasic acids of the fatty acid series having from 9 to 22 carbon atoms, either saturated or unsaturated, for example, pelargonic, lauric, myristic, palmitic, oleic, stearic, behenic and linoleic acids.

The dimer acid employed in the present invention may be the commercial acids described above containing both the trimer (tribasic) and monomeric (monobasic) acid contents, or may be refined to remove either or both of these constituents. Further, the dimer acid may be subjected to partial or complete hydrogenation to reduce the unsaturation before it is used to form the intermediate polyester.

One-component moisture-cured urethane coatings prepared from polyesters are recognized as the standard in the trade. The urethane coatings of the invention are compared below with the polyether based coatings and with unmodified dimerate polyester coatings to demonstrate the unique combination of the abrasion resistance of polyether-based coatings with the superior solvent and chemical resistance and weathering qualities of the dimerate polyester coatings. Since film properties are influenced by the degree of cross link (cross-link density), percent NCO, and the average molecular weight of the prepolymer per branch point or cross linking site, the various test polymers were selected or prepared to provide substantial equivalents as to these factors. Therefore, in the comparative results given below the composition of the polyol (polyester or polyether) is the controlling factor in influencing the film properties. The comparisons below are made of the properties of coatings prepared from the polymers of the invention with urethane coatings obtained or prepared as follows:

(A) A polyester urethane containing only dimer acid and no lower molecular weight dibasic acid prepared by the method of Example I.

(B) A commercially available moisture-cured polyether urethane based on a polypropylene glycol.

The present invention is further illustrated by the following complete specific embodiments.

Example I 196 parts (0.67 equivalent) of dimer acid prepared from tall oil fatty acids containing approximately 87% dimer, 17% trimer and a trace of monomer, 50 parts (0.67 equivalent) phthalic anhydride and 33 parts (0.67 equivalent) maleic anhydride are reacted with 140 parts (2.65 equivalents) diethylene glycol at a temperature of 220–230° C. Water of esterification is continuously removed by nitrogen gas purge until an acid number of about 3 to 4 is reached. The resulting intermediate polyester has a hydroxyl value of 100, and a hydroxyl functionality of about 2 and a molecular weight of approximately 1100. 42 parts of this mixed acid polyester are then blended with about 8 parts trimethylol propane and 3 parts butanediol in a solvent of equal parts of Cellosolve acetate and xylene, totaling 67 parts. The solution is subjected to azeotropic drying with 5% benzene based on the solids charged to remove all traces of water.

46 parts of tolylene diisocyanate (80/20) are then added over about 15 minutes under reflux conditions while controlling the temperature at about 100° F. and then the reaction is permitted to continue for 2 to 3 hours at 190–200° F. until the percent NCO closely approaches the calculated theoretical value of 8.8%.

The isocyanate-terminated prepolymer solution is then stabilized by 1 part each of an antioxidant "Zalba" a fortified hindered phenol which acts as a non-taining antioxidant with a specific gravity of 1.30. This material is described in formal report number 57–9 published July 1957, and an ultra-violet light absorber "Uvinul D–49" which is 2,2' - dihydroxy-4,4' - dimethoxybenzophenone having the structural formula:

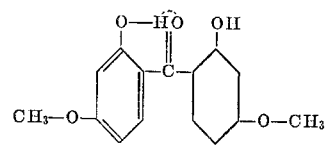

Additional solvent is added to provide the desired percent solids (about 50% solids) as a one-component moisture curable urethane coating. The above preparation has an extended pot life, and good can stability as indicated by storage stability after 6 months at 30° C. and is suitable for packing as a clear finish.

Samples of the urethane coating formulated as above and other urethane varnish test coatings described above were applied to various substrates in three mil film thicknesses from solutions of about 40% N.V. (non-volatile or solid material) and the films were cured at 70° F., 50% relative humidity for one week, except where otherwise indicated. After curing the films were tested for physical properties as described and recorded in Table I.

TABLE I.—CLEAR FILM PHYSICAL PROPERTIES

| Sample | Example 1 | Varnish A | Varnish B |
|---|---|---|---|
| Designation | Modified Dimer | Unmodified Dimer | Polyether |
| Taber Abrasion [1] | 35 | 85 | 37 |
| Hardness Sward | 30 | 37 | 25 |
| Impact Resistance Reverse (Gardner in lb.) | 160 | 160 | 160 |
| Flexibility ⅛" Mandrel | Pass | Pass | Pass |
| Dry Time (minutes) | 25–30 | 25–30 | 25–30 |
| Chemical Tests (4 hrs. at 75° F.): | | | |
| 20% NaOH | NE [2] | NE | NE |
| 5% HCl | NE | NE | NE |
| Conc. HCl | Light Stain | Dark Stain | Dissolved. |
| Conc. Acetic Acid | Cracking | Heavy Blister | Do. |
| Anionic Textile Wetting and Rewetting Agent | NE | NE | Do. |
| Textile Fiber Lubricant | Slight Spotting | | Spotting and Softening. |
| Stain Tests (4 hrs. at 75° F.): | | | |
| Crayon | NE | NE | Slight Bleach. |
| Mustard | Severe | Moderate | Severe |
| Merthiolate | Moderate | Light | Do. |
| Ink | do | Moderate | Do. |
| Coffee | NE | NE | Light |

TEST CONDITIONS

| Property | Test Method | Substrate |
|---|---|---|
| Abrasion Resistance | Taber (mg. loss/1,000 revs.), CS-10 Wheel. | Steel. |
| Hardness | Sward | Plate Glass. |
| Impact Resistance | Gardner Variable Tester. | Bonderized Steel. |
| Flexibility ⅛" Mandrel | ASTM D-1737-62 | Tin Plate. |
| Dry Time | ASTM D-1640-59 | Plate Glass. |
| Chemical Resistance | 4 hrs. spot tests. Rating by ASTM D-714-56 and FTM 2000 (141) Photographic Standards. | Bonderized Steel. |
| Stain Resistance | 4 hr. spot tests | White Vitrolite. |

[1] Cured at 70° F., 65% R.H. in 14 days.   [2] No effect—excellent.

Note the marked improvement in the abrasion resistance of the urethane coatings of the invention compared to those based on the unmodified dimerate polyester. The hardness of the dimerate polyester based coasting modified with phthalic and maleic acids was comparable to the unmodified dimerate based coating. It is surprising that with such a large increase in abrasion resistance there is only a slight reduction in hardness of the coatings of the present invention. In addition, the coatings retain the superior chemical resistance of the dimerate polyester type. Furthermore, in Florida exposure tests the new coatings exhibited an even greater exterior durability than the unmodified dimer acid based polyester coatings, which in turn exhibited a large superiority over polyether-based urethane coatings in one year tests.

Examples II and III

Urethane coating formulations are prepared as described in Example I except that in one case, phthalic anyhdride is eliminated in the preparation of the polyester, and in another case maleic anhydride is eliminated with adjustment of the glycol quantity to provide hydroxyl numbers and molecular weights corresponding to the polyester of Example I. Coatings prepared in three mil wet thickness and cured in the same manner as described for the tests of Table I exhibit properties directly comparable to those of the dimer/phthalic/maleic acid polyester base coatings.

The moisture-cured coatings of the present invention are particularly suitable for heavy duty floor finishes because of the high levels of abrasion and chemical resistance. In particular, their exceptional resistance to acids and textile chemicals indicate a long coating life in such application areas as textile mills and gymnasiums. Their excellent weathering and exterior durability characteristics also suggest their use on exterior substrates such as open decks and as maintenance finishes for concrete and pre-finished building materials having exterior exposures.

It is to be understood that the invention, although primarily directed to one-component urethane systems, includes those instances where a faster cure may be desired and a catalyst, such as those conventional with urethanes, e.g., a tertiary amine is added to the prepolymer. The advantages of the invention in terms of the unique combination of film properties are fully realized where a catalyst is used.

The term "fat acid" as used in the claims and as commonly employed in the art, means higher fatty acids derived from animal fats, vegetable oils and other oils, such as tall oil.

What we claim is:

1. Moisture-curable urethane coating compositions comprising a branched chain isocyanate-terminated urethane polymer which is the reaction product of a polyfunctional isocyanate having an isocyanate functionality of at least 2, an aliphatic $C_3$ to $C_6$ polyol, and a hydroxyl-terminated polyester formed by reaction of an excess of an aliphatic diol having from 2 to 6 carbon atoms and a mixture of dicarboxylic acids comprising from 20 to 80 mole percent (based on total dicarboxylic acid) of dimerized fat acids and from 80 to 20 mole percent of at least one lower molecular weight dicarboxylic acid selected from the group consisting of pathalic, maleic, isophthalic and fumaric acids, phthalic anhydride, maleic anhydride, and mixtures thereof, said polyester having a hydroxyl functionality of about 2, an acid value below about 5, and a molecular weight of from about 500 to 2500.

2. A composition according to claim 1 in which the dimer acid is present in equal molar quantities with both phthalic and maleic acids.

3. A composition according to claim 2 in which the diol is diethylene glycol.

4. A composition according to claim 1 in which the dimerized acids contain minor amounts of trimeric acids and corresponding amounts of $C_9$ to $C_{22}$ monobasic aliphatic carboxylic acid are added in forming the polyester.

5. A composition according to claim 1 in which the dimer acids are predominantly $C_{36}$ acids.

6. A composition according to claim 1 in which up to 5% by weight of a diol is reacted with the isocyanate in forming the prepolymer.

7. A composition according to claim 1 in which the isocyanate and polyol are reacted before reaction of the isocyanate with the polyester.

8. The composition of claim 1 wherein said polyfunctional isocyanate is used in sufficient excess that it reacts with all of the hydroyl groups of said polyester and said diol.

9. A urethane coating applied to a substrate and cured by reaction of atmospheric moisture with a branched chain isocyanate-terminated urethane prepolymer which is the reaction product of
  (1) a polyfunctional isocyanate having an isocyanate functionality of at least 2,
  (2) a polyol of from 3 to 6 carbons and 3 to 4 hydroxyl groups, and
  (3) a hydroxyl-terminated polyester formed by reaction of an excess of an aliphatic diol having from 2 to 6 carbon atoms and a mixture of dicarboxylic acids comprising from 20 to 80 mole percent (based on total dicarboxylic acid) of dimerized fatty acids derived from fats and oils containing mono and poly-unsaturated fatty acids and from 80 to 20 mole percent of at least one lower molecular weight dicarboxylic acid selected from the group consisting of phthalic, maleic, isophthalic and fumaric acids, phthalic anhydride, maleic anhydride, and mixtures thereof, said polyester having a hydroxyl functionality of about 2, and acid value below about 5, and a molecular weight of from about 500 to 2500.

10. A coating according to claim 9 in which the dimer acid is present in equal molar quantities with both phthalic and maleic acids.

11. A coating according to claim 9 in which the diol is diethylene glycol.

12. A coating according to claim 9 in which the dimerized acids contain minor amounts of trimer acids and corresponding amounts of $C_9$ to $C_{22}$ monobasic aliphatic carboxylic acid are added in forming the polyester.

13. A coating according to claim 9 in which the dimer acids are predominantly $C_{36}$ acids.

14. A coating according to claim 9 in which up to 5% by weight of a diol is reacted with the isocyanate in forming the prepolymer.

15. A coating in according to claim 9 in which the isocyanate and polyol are reacted before reaction of the isocyanate with the polyester.

16. The coating of claim 9 wherein said polyfunctional isocyanate is used in an excess sufficient to react with all of the hydroxyl groups of said polyol and said hydroxyl-terminated polyester.

References Cited

UNITED STATES PATENTS

| | | | |
|---|---|---|---|
| 2,802,795 | 8/1957 | Simon et al. | 260—22 |
| 3,057,824 | 10/1962 | Le Bras et al. | 260—22 |
| 3,106,537 | 10/1963 | Simon et al. | 260—22 |
| 3,250,749 | 5/1966 | Erickson et al. | 260—75 |
| 3,260,735 | 7/1966 | Powers | 260—75 |
| 3,264,236 | 8/1966 | Santaniello | 260—22 |

FOREIGN PATENTS

| | | |
|---|---|---|
| 884,153 | 12/1961 | Great Britain. |
| 632,220 | 12/1961 | Canada. |

OTHER REFERENCES

Zimmerman & Lavine, Supplement III to the 1953 Edition of Handbook of Material Trade Names, Industrial Research Service Inc., Dover, N.H., 1960, p. 280.

DONALD E. CZAJA, *Primary Examiner.*

R. W. GRIFFIN, *Assistant Examiner.*